(12) United States Patent  
Round (10) Patent No.: US 9,908,188 B2
(45) Date of Patent: Mar. 6, 2018

(54) VARIABLE RAKE SHEAR (71) Applicant: PRIMETALS TECHNOLOGIES, LIMITED, London (GB)

(72) Inventor: Philip Round, Ashover (GB)

(73) Assignee: PRIMETALS TECHNOLOGIES, LIMITED (GB)

( * ) Notice: Subject to any disclaimer, the term of this patent is extended or adjusted under 35 U.S.C. 154(b) by 535 days.

(21) Appl. No.: 14/408,640

(22) PCT Filed: Jul. 10, 2013

(86) PCT No.: PCT/EP2013/064560
§ 371 (c)(1),
(2) Date: Dec. 17, 2014

(87) PCT Pub. No.: WO2014/016119
PCT Pub. Date: Jan. 30, 2014

(65) Prior Publication Data
US 2015/0174673 A1    Jun. 25, 2015

(30) Foreign Application Priority Data

Jul. 27, 2012  (GB) .................................. 1213378.1

(51) Int. Cl.
B23D 15/14 (2006.01)
B23D 35/00 (2006.01)
(52) U.S. Cl.
CPC ........... *B23D 35/005* (2013.01); *B23D 15/14* (2013.01); *Y10T 83/05* (2015.04); *Y10T 83/0553* (2015.04);
(Continued)
(58) Field of Classification Search
CPC ...... B23D 15/14; B23D 35/005; B23D 15/02; B23D 15/00; Y10T 83/884;
(Continued)

(56) References Cited

U.S. PATENT DOCUMENTS 1,173,580 A * 2/1916 Jennings .............. B23D 35/005
144/162.1
1,569,569 A * 1/1926 Pels ..................... B23D 35/005
83/522.23
(Continued)

FOREIGN PATENT DOCUMENTS

CN 101444854 A 6/2009
CN 201329442 Y 10/2009
(Continued)

OTHER PUBLICATIONS

International Search Report dated Dec. 13, 2013 issued in corresponding International Patent Application No. PCT/EP2013/064560.

(Continued)

*Primary Examiner* — Kenneth E. Peterson
*Assistant Examiner* — Nhat Chieu Do
(74) *Attorney, Agent, or Firm* — Ostrolenk Faber LLP (57) ABSTRACT A variable rake shear comprises a housing (8), a first blade (1) mounted in a first blade mounting (4), a second blade (2) mounted in a second blade mounting (3); and a control device (5) to control movement of one blade mounting to shear the material. Each blade mounting is movable in at least one dimension relative to the housing. One blade is an active blade (1) and the other blade is a passive blade (2). A rake adjustment mechanism (6a, 6b) for at least one of the mountings (3, 4) and the mounting (4) for the active blade (1) has a torque tube linkage mechanism (10, 11, 12).

10 Claims, 10 Drawing Sheets (52) U.S. Cl.
CPC .......... *Y10T 83/884* (2015.04); *Y10T 83/8854* (2015.04); *Y10T 83/8858* (2015.04)

(58) Field of Classification Search
CPC . Y10T 83/8854; Y10T 83/8858; Y10T 83/05; Y10T 83/0553
USPC .................. 83/34, 644, 640–641, 636, 461
See application file for complete search history.

(56) References Cited

U.S. PATENT DOCUMENTS

| | | | | |
|---|---|---|---|---|
| 1,986,685 A * | 1/1935 | Soderberg | ............ | B23D 15/08 83/644 |
| 2,699,649 A | 1/1955 | Messick | | |
| 3,316,791 A | 5/1967 | Greis et al. | | |
| 3,568,558 A | 3/1971 | Achille | | |
| 3,842,699 A | 10/1974 | Zyl | ................................ | 83/157 |
| 3,872,756 A | 3/1975 | Pearson | | |
| 3,911,775 A | 10/1975 | Pearson | ............................ | 83/626 |
| 3,924,499 A | 12/1975 | Dechambre | ........................ | 83/96 |
| 4,459,889 A * | 7/1984 | Holton | .................... | B23D 15/08 83/597 |
| 4,632,163 A * | 12/1986 | Fandrich | ................. | A01G 23/08 144/336 |
| 4,932,301 A * | 6/1990 | Buck | ..................... | B26D 7/2614 83/640 |
| 6,161,460 A | 12/2000 | Johnson et al. | ................. | 83/821 |
| 2007/0144281 A1* | 6/2007 | Inoue | .................. | F16H 25/2015 74/89.23 |
| 2010/0107790 A1* | 5/2010 | Yamaguchi | ............ | A61G 7/018 74/89.38 |

FOREIGN PATENT DOCUMENTS

| | | | |
|---|---|---|---|
| CN | 101890531 A | 11/2010 | |
| DE | 2037270 | 2/1972 | |
| DE | 2360837 A1 | 1/1975 | |
| DE | 3303540 A1 * | 8/1984 | ............ B23D 15/02 |
| DE | 102011089818 A1 * | 6/2013 | ............ B23D 15/02 |
| EP | 0421782 A3 | 4/1992 | |
| EP | 1572408 A1 | 9/2005 | |
| GB | 959830 A | 6/1964 | |
| GB | 1270695 A | 4/1972 | |
| GB | 1457324 A | 12/1976 | |
| GB | 2093748 A | 9/1982 | |
| GB | 2405118 A | 2/2005 | |
| JP | 58-35290 | 3/1983 | |
| JP | S6389215 A | 4/1988 | |
| JP | H0246995 A | 2/1990 | |
| JP | H07223109 A | 8/1995 | |
| JP | 4836786 B2 | 12/2011 | |
| JP | 5244488 B2 | 7/2013 | |
| KR | 2000-0029988 | 5/2000 | |
| NL | 7702926 A | 9/1978 | |
| RU | 2054344 C1 | 2/1996 | |
| RU | 2087273 C1 | 8/1997 | |
| RU | 2187412 C2 | 8/2002 | |
| RU | 43205 U1 | 1/2005 | |
| SU | 1152726 A | 4/1985 | |

OTHER PUBLICATIONS

Written Opinion dated Dec. 13, 2013 issued in corresponding International Patent Application No. PCT/EP2013/064560.
Search Report dated Nov. 26, 2012 issued in corresponding United Kingdom patent application No. GB1213378.1.
EPO Office Action dated Dec. 7, 2016 in corresponding European Patent Application No. 13 739 634.7 (total 5 pages).
Office Action dated Nov. 23, 2015 issued in corresponding Chinese Patent Application No. 201380021340.6 with English translation.
Office Action dated Jan. 24, 2017 issued in corresponding Chinese Patent Application No. 201380021340.6 with English translation.
Notice of Allowance dated Feb. 6, 2017 issued in corresponding Japanese Patent Application No. 2015-512089.
Russian Federation Office Action, dated Mar. 18, 2016, issued in corresponding Russian Federation Application No. 2015102311/02(003582). Total 7 pages.
Office Action dated Sep. 28, 2016 issued in corresponding Korean Patent Application No. 10-2015-7005146.

* cited by examiner

FIG 1B

PRIOR ART

FIG 1A

PRIOR ART

VARIABLE RAKE SHEAR

CROSS-REFERENCE TO RELATED APPLICATIONS

The present application is a 35 U.S.C. § § 371 National Phase conversion of PCT/EP2013/064560, filed Jul. 10, 2013, which claims priority of Great Britain Patent Application No. 1213378.1, filed Jul. 27, 2012, the contents of which are incorporated by reference herein. The PCT International Application was published in the English language.

TECHNICAL FIELD

This invention relates to a variable rake shear and method of operation, in particular for metal slab or plate.

TECHNICAL BACKGROUND

Figure 1A:
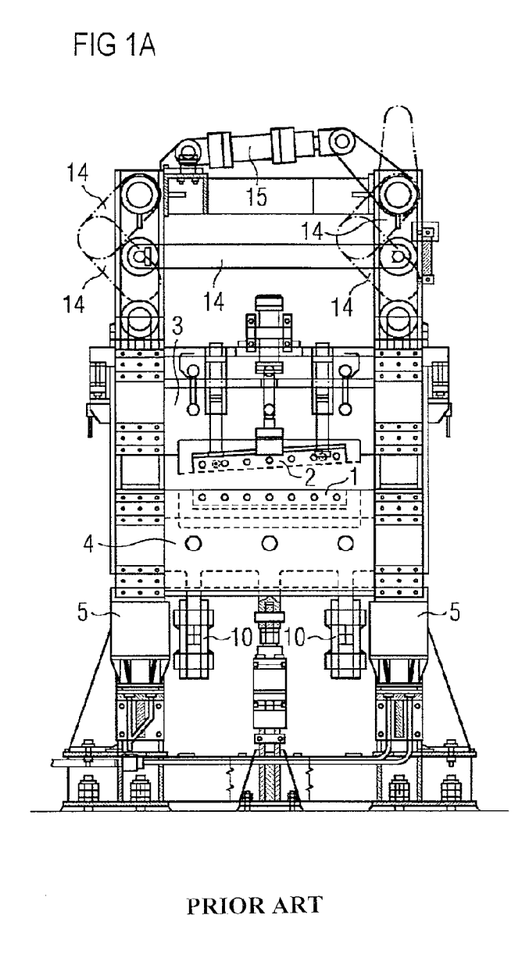
FIG. 1A illustrates a front view of a conventional prior art up-cut hydraulic shear.
Figure 1B:
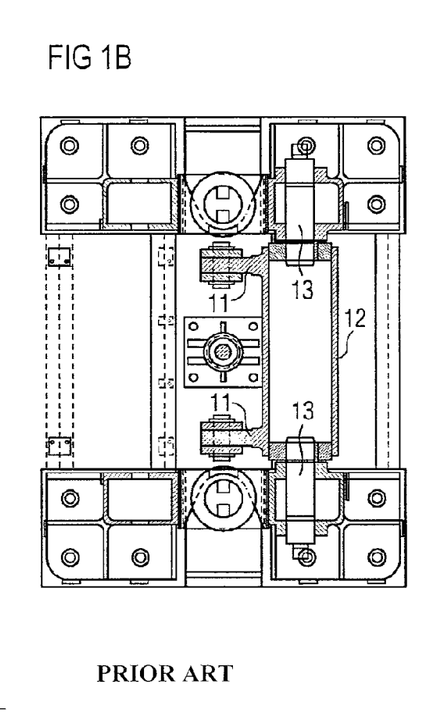
FIG. 1B illustrates a bottom view thereof.

A conventional heavy duty slab shear is illustrated in FIGS. 1A and 1B. This shear is a hydraulic up-cut type shear in which the bottom blade 1 supported on bottom beam 4 is moved upwards by two cylinders 5 in order to carry out the shearing action. The shear features a single raked top blade 2 at a fairly steep rake, typically 16:1, in order to keep the load at a reasonable level when cutting thick, hard alloy slabs, typically of the order of 150 mm thick. The design illustrated in FIGS. 1A and 1B also features a toggle lowering and raising mechanism 14 which is operated by hydraulic cylinder 15 for quickly lowering the top blade to a fixed position for the cut and raising it to provide a large clearance. As is usual with such toggle mechanisms it is designed such that when the top blade is in the lowered cutting position the links are very close to vertical and therefore there is almost no load on the cylinder 15 and the cutting force is transferred directly through the links to the housing. The hold down clamp has been omitted from FIGS. 1A and 1B for clarity.

The conventional design illustrated in FIGS. 1A and 1B also features a torque tube and linkage mechanism 10, 11, 12, 13 to keep the bottom beam 4 and bottom blade 1 level during the cutting movement. This type of mechanism is well known in the prior art. For example U.S. Pat. No. 2,699,649 features a similar torque tube and linkage arrangement. The advantage of using such a torque arm linkage mechanism is that each of the cylinders 5 only has to produce approximately half of the total cutting force.

Although the shear functions satisfactorily, these features result in certain operational problems. Because the rake of the top blade is chosen to be quite steep in order to minimise the cutting force when cutting thick and strong material it causes significant distortion and twisting of the slabs and plates at all thicknesses with resultant impact on roller tables and potential issues for getting plate products into the jaws of the stretcher. Also the bottom blade has to move upwards by the same large distance for all products in order to complete the cut and therefore all the products drop back onto the table by this distance and this can cause marking and damage. In addition, the cylinders 5 have to move through a large stroke for every cut which requires a lot of hydraulic oil and which makes the cutting time longer than it needs to be.

In addition, increasing width and duty requirements are stretching the capability of the existing shears and the use of a rolling blade shear solution, whether hydraulically operated as in GB2405118 for example or mechanically operated as in EP1572408 for example is costly. Particularly, when shearing aluminium, flexibility is important, so shears are required to perform the mixed functions of nose cropping, tail cropping, dividing and plate shearing, not just a single function.

When cutting thick and hard material it is clearly advantageous to have a fairly steep rake on the blade in order to minimise the cutting force. However, when cutting thinner material it is advantageous to reduce the rake of the blade in order to minimise the distortion and twisting of the material, to minimise the cutting stroke required and thus reduce the cutting time and—in the case of an up-cut shear—to minimise the distance which the cut piece has to drop back onto the table.

U.S. Pat. No. 3,568,558 describes an arrangement for controlling the angle of inclination between an upper movable blade and a lower fixed blade of a shear. A pulley system operates a pair of pilot valves to adjust the angle of the moveable blade and to move the moveable blade up and down at the predetermined angle. This arrangement is capable of setting a steep rake when cutting thick and strong material and of setting a reduced rake when cutting thinner material. However in this arrangement each of the two hydraulic cylinders 2 and 3 must be capable of generating the full cutting force or almost the full cutting force. The reason for this is that, when shearing with a raked blade, at any particular instant during the cutting cycle the cutting force is only applied to a relatively short length of the blade and the position of the highly loaded part of the blade moves along the blade during the cut. By taking moments of the forces it is clear that when the loaded part of the blade is at one end almost all of the cutting force is applied to just one of the cylinders.

U.S. Pat. No. 3,872,756 describes an alternative mechanism for controlling rake angle and stroke of a shear having an upper movable blade and a lower fixed blade. This design suffers from the same problem as that of the shear described in U.S. Pat. No. 3,568,558; namely that each of the hydraulic cylinders 27 must be capable of generating the full cutting force or almost the full cutting force.

In these prior art shears the fact that the two hydraulic cylinders each have to be capable of generating the full cutting force makes the shears expensive to construct and also means that they require approximately twice the hydraulic fluid flow that is theoretically required.

SUMMARY OF THE INVENTION

A first aspect of the present invention concerns a variable rake shear. The shear comprises a housing, a first blade mounted in a first blade mounting, a second blade mounted in a second blade mounting; and a control to control movement of one of the first and second blade mounting to shear the material. Each blade mounting is movable in at least one dimension relative to the housing; wherein one of the first and second blades is an active blade and the other of the first and second blades is a passive blade. The shear further comprises a rake adjustment mechanism for at least one of the first and second blade mountings; and the mounting for the active blade further comprises a torque tube linkage mechanism.

The shear of the present invention allows the rake angle of at least one blade relative to the material to be sheared to be set as required and if necessary adjusted between cuts. The shear of the present invention can be retrofitted, as well as installed in a new plant.

Preferably, the blade rake adjustment mechanism for the active blade comprises a clutch in the torque tube linkage mechanism.

This enables the rake angle of the cutting blade relative to the material to be sheared to be adjusted between cuts, but kept at the set rake angle during cutting.

In one embodiment, the present invention provides a combination of a variable rake blade and a hydraulically operated shear which has either a single hydraulic cylinder or which shares the cutting force between at least two hydraulic cylinders. With multiple cylinders, each individual cylinder does not need to have sufficient cutting force on its own, but the overall combination must be sufficient.

The active blade mounting may comprise a single hydraulic cylinder, of sufficient size to provide the required full cutting force, but preferably the active blade mounting comprises one or more hydraulic cylinders, the maximum cutting force applied to the active blade being substantially equal to the sum of the maximum cutting forces provided by the one or more hydraulic cylinders.

This is the optimum situation, although there would still be benefit in using groups of cylinders in which the sum of the maximum cutting forces provided by the groups of cylinders exceeds the maximum cutting force applied to the active blade, but the sum is still significantly less than is possible in a conventional arrangement.

Preferably, the blade rake adjustment mechanism for the passive blade comprises at least one adjuster mounted between the mounting and the housing.

Although the adjuster could comprise hydraulic cylinders, these add cost, weight and bulk for a component which is generally positioned at set-up only. Therefore preferably the adjuster comprises a mechanical adjuster.

Preferably, the mechanical adjuster is chosen from one or more screws; or removable supports in the housing; or eccentrics; or wedges; or cams.

Preferably, the shear comprises two mechanical adjusters, one at each slideway or guide at a respective side of the housing.

This allows the gap between the passive and active blade mountings to be set, as well as the rake angle, so that different thickness plates or slabs can be handled, the vertical gap being opened up for large clearance.

Preferably, the shear further comprises a toggle mechanism.

This mechanism allows large shear openings.

Preferably, a rake adjustment mechanism is provided for both the first blade mounting and the second blade mounting.

Preferably, the shear further comprises a balancing cylinder connected between the mounting of the passive blade and the housing.

Preferably, the shear further comprises one or more material clamps to clamp the material during cutting.

There may be a separate clamp to clamp the material against each blade, or to a clamp to clamp the material in position when both blades are raked.

A second aspect of the present invention concerns a method of operating a variable rake shear to shear material. The method comprises mounting a first blade in a first blade mounting, mounting a second blade in a second blade mounting, wherein each blade mounting is movable in at least one dimension relative to the housing; applying a rake angle to one of the first and second blade mountings; wherein one blade is an active blade and the other blade is a passive blade, connecting the mounting of the active blade to a torque tube linkage mechanism; and controlling movement of the blade mounting of the active blade to shear the material.

Preferably, rake is applied to the active blade by disconnecting a clutch in a torque tube linkage mechanism of the blade mounting; adjusting the rake angle of the blade in the blade mounting; and reconnecting the clutch.

Preferably, the method further comprises applying rake to the passive blade by adjusting one or more mechanical adjusters.

Preferably, the method comprises setting a minimum gap between the blades using at least two adjusters, one at each guide at a respective side of the housing.

Preferably, the method comprises adjusting the rake angle according to the thickness and strength of the material to be sheared.

Preferably, the method comprises altering the rake of one or both blades between successive cuts on the same piece of material.

This allows a different rake to be applied for a head cut and a tail cut on the material.

In one embodiment, the method further comprises applying rake to both the first and second blade mountings.

This allows a divide cut to be carried out where there is no scrap on one side of the material.

Alternatively, the method comprises applying rake to the blade contacting the part of the material to be scrapped.

This avoids damage to the prime material.

Preferably, the method further comprises varying the stroke of the movement of the active blade according to at least one of the rake angle of the one or more blades; the width of material being sheared; the position of the material relative to the centreline of the shear; or the elongation to fracture of the material.

BRIEF DESCRIPTION OF THE DRAWINGS

An example of a variable rake shear in accordance with the present invention will now be described with reference to the accompanying drawings in which.

DESCRIPTION OF AN EMBODIMENT

Figures 2A, 2B:
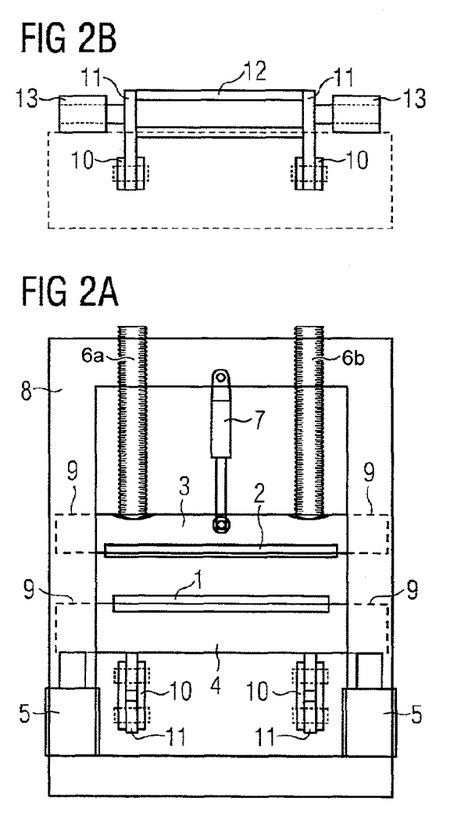
FIG. 2A illustrates an example of a variable rake shear according to the present invention before varying the rake.
FIG. 2B is a bottom view which shows torque linkage elements of FIG. 2A in more detail.
Figure 2C:
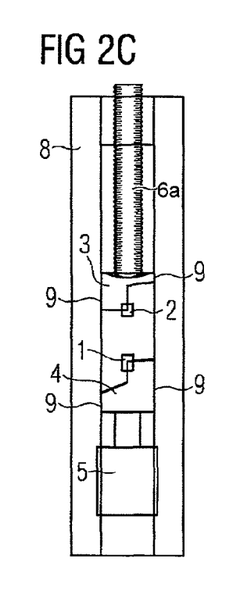
FIG. 2C shows one side of FIG. 2A from outside its housing.
Figure 2D:
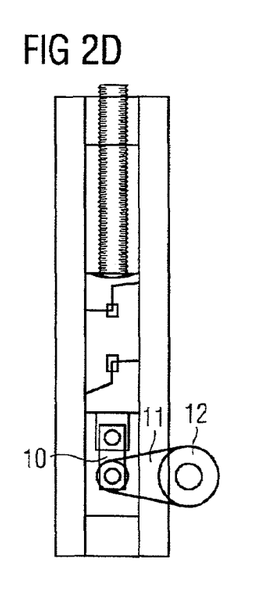
FIG. 2D shows one side of FIG. 2A from inside its housing.

For the purpose of this disclosure, the term "rake" means the angle of the top blade relative to the bottom blade in the plane of the cut. An example of a variable rake shear according to the present invention is illustrated in FIGS. 2A-2D and 3. FIG. 2A is a view from in front of the shear, with both blades 1, 2 in their initial positions. A first blade 1 is mounted in one upwardly facing edge of a first beam 4 which is able to move vertically within the structure of a housing 8 on slideways, via guides 9, one guide at each side of the beam and thereby at each side of the housing. Some surfaces of the beam 4 may make contact with each side wall of the guides 9 as shown in FIGS. 2C and 2D. The beam is supported on cutting cylinders 5. In the preferred embodiment there are two cutting cylinders 5 so that the cutting forces can be easily and directly transferred into the two sides of the housing 8, but embodiments with a single cutting cylinder or with more than two cylinders are also possible. The beam 4 is also connected to a torque linkage 10, 11, 12, 13, illustrated in more detail in FIG. 2B. The torque linkage comprises a torque tube 12 on torque tube bearings 13 and torque links 10 on torque tube arms 11 connected to the torque tube 12. The other end of the torque links 10 connect to the beam 4. The torque linkage ensures that the bottom beam 4 and blade 1 stay almost horizontal whatever the moments on the beam 4 from the cutting force and the cylinder forces acting on the beam.

When cutting, there is an active and a passive blade. In this example the bottom blade is the active blade and with more than one cylinder, the total cutting force applied to the blade is equal to the sum of the cutting forces from all the cylinders. However, if the active blade has no torque tube linkage (as is the case in the conventional up-cut shear described above), then the forces in the cylinders vary during the cutting cycle. At the start of the cut cycle the cylinder associated with the leading end of the blade sees a high force while the cylinder associated with the trailing end of the blade sees a low force. At the end of the cutting cycle it is the trailing end cylinder which sees the high force while the leading end cylinder sees the low force. Added together, the cylinder forces at any point during the cutting cycle equal the cutting force, but the maximum forces seen by the cylinders at any point in the cutting cycle when added together amount to significantly more cutting force, for two cylinders this is approximately double. The advantage of the torque tube linkage is that the load is shared between the cylinders 5 equally, so the sum of the maximum forces in the cylinders is equal to the maximum cutting force. Thus, the two cutting cylinders 5 only need to produce approximately half of the maximum cutting force each and each cylinder can be smaller than without the torque tube linkage.

A second blade 2 is mounted in one downwardly facing edge of a second upper beam 3 which is also able to move within the structure of a housing 8 on slideways, via guides 9 and some surfaces of the second beam 3 may come into contact with each side wall of the guides 9 as shown in FIGS. 2C and 2D. The beam 3 is connected at positions located toward its opposite side edges to adjusters 6a, 6b, typically mechanical adjusters. Such mechanical adjusters may be selected from various alternatives. The two such adjusters allow the rake of the shear to be adjusted by operating each adjuster in a respective manner.

Adjusters 6a and 6b in FIGS. 2A, 3 and FIGS. 4A-4D are screws which extend from upper beam 3 through threaded openings 21 in housing part 8a. Adjustment of each screw determines the rake.

The mechanical adjusters, which take the form of adjusters 6a and 6b in FIGS. 2A, 3, and 4A-4D, are, in FIGS. 6A-6D, movable supports 22a, 22b with three height steps 23, 24, 25. Respective shift mechanism 26 for each support 22a, 22b moves a selected one of the steps of that support between one end region of the beam 3 and the housing 8 for adjusting the rake. The selection of a respective step of each support determines the rake.

The mechanical adjusters, movable wedges 27a, 27b, shown in FIGS. 7A-7D, are movable like movable supports 22a, 22b, in FIGS. 6A-6D. Each wedge is moved by a respective shift mechanism 28 to adjust the spacing between the beam 3 and the housing 8. Each wedge has a top surface 29a, 29b that engages a cam block 30 supported on housing part 8a to cause the adjustment.

The mechanical adjusters, adjustable eccentrics 31 shown in FIGS. 8A-8D each comprise a rockable beam 31a, 31b on the beam 3, an eccentric connection at 32 to a rotatable disk 33, which rotates on a support 34. Rotation of the disk 33 by a handle 34a adjusts the rake of the blade 2.

Cams 35a, 35b shown in FIGS. 9A-9D operate like the eccentrics 31 shown in FIGS. 8A-8D. Each support 36a, 36b on the housing part 8a supports a cam 35a, 35b to rotate. The cams 35a, 35b also contact a respective cam follower 37a, 37b fixed on the beam 3. Rotation of the cam by the handle 39 causes the shaped profile 40 of each cam to adjust the spacing between the beam 3 and the housing part 8.

Figures 10A, 10C:
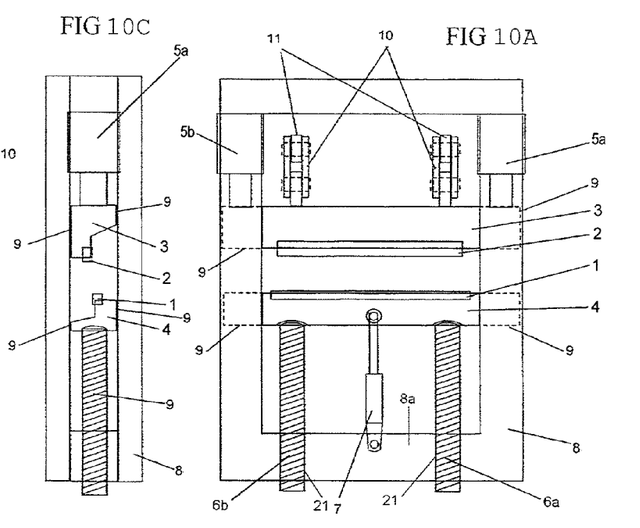
FIGS. 10A-10D show corresponding embodiments to the embodiments in FIG. 4, except that the top blade is the active blade, the torque tube linkage is connected to the top beam, the torque tube linkage and appropriate other components of the variable rake shear of FIGS. 4A-4D have been moved accordingly, and a control device is shown in FIG. 10B.
Figure 10B:
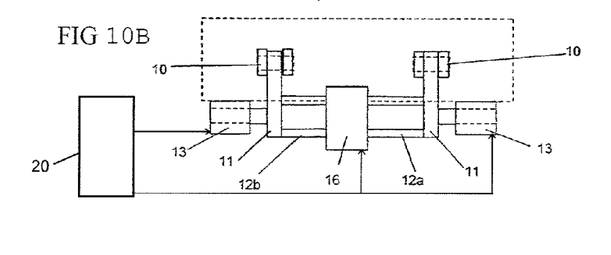
Figure 10D:
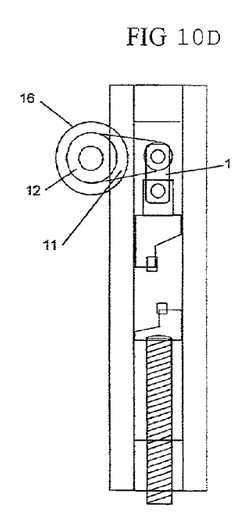

FIGS. 10A-10D show the embodiments of FIG. 4A-4D, except that the top blade 2 has become the active blade, instead of the passive blade, as shown in FIGS. 4A-4D, and the bottom blade 1 has become the passive blade, instead of the active blade, as shown in FIGS. 4A-4D, and the torque tube linkage 10, 11, 12, 13, the cutting cylinders 5a, 5b, the hydraulic balancing cylinder 7, and the adjusters 6a, 6b have been moved accordingly. In particular, torque tube linkage 10, 11, 12, 13 and cutting cylinders 5a, 5b are now located above upper beam 3, instead of being below bottom beam 4, in FIGS. 4A-4D. Torque tube linkage 10, 11, 12, 13 is connected to upper beam 3, instead of being connected to bottom beam 4, as shown in FIGS. 4A-4D. Adjusters 6a and 6b and hydraulic balancing cylinders 7 are now located below bottom beam 4, instead of being above upper beam 3, as shown in FIGS. 4A-4D. In addition, FIGS. 10B shows control device 20 controlling torque tube linkage 10, 11, 12, 13 so as to control movement of the blade mounting, upper beam 3, to which torque tube linkage 10, 11, 12, 13 is connected.

For ease of set-up, as illustrated in this embodiment, the beam 3 hangs from a hydraulic balancing cylinder 7, but this could be omitted with the screws, or other mechanical adjustment mechanism, supporting the beam, as well as adjusting its rake angle. Alternatively, a single screw towards one end of the beam may provide both support and adjustment, with a fixed support in the housing guide at the opposite end providing a surface on which the other end of the beam 3 pivots.

Figure 3:
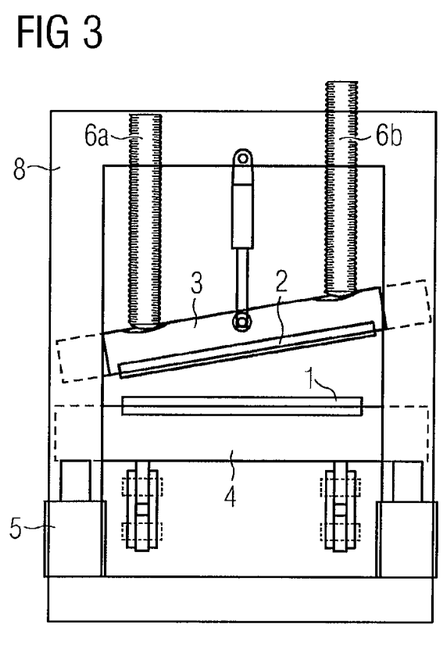
FIG. 3 shows the example of FIG. 2A, with the top blade raked.

FIG. 3 shows the embodiment of FIG. 2A, with the second blade 2 at a raked angle. This is achieved by extending the screw 6a and by retracting the screw 6b, so that the second beam 3 pivots in the housing guide 9, resulting in the relative angle of the first blade and second blade varying. The rake of the second blade is varied so that it is optimised for the material being cut. In addition, the blade height position may also be varied by suitable adjustments to the length of the screws. Before the cut takes place, there is a gap between the lowest part of the top blade and the uppermost part of the bottom blade. This gap is chosen according to the thickness of the material to be cut. Position control is provided on the lift of the up-cut blade, so that the stroke is appropriate for the variable top blade geometry. When the rake angle of the blade is steep the bottom blade 1 clearly has to lift up much further to complete the cut than when the rake angle is shallow. If desired the stroke of the up movement to carry out the cut can also be adjusted according to the width of the material being cut, the position of the material relative to the centre-line of the shear and/or the elongation to fracture of the material being cut. Position measurement is required for limited stroke control and this is typically provided by position transducers mounted within the cutting cylinders 5 or by position transducers attached between the bottom beam 4 and the housing 8 (not shown).

Having set up the rake angle and initial position of the up-cut blade, material is passed along the line for shearing, and transported along roller tables at each side of the shear. A controller (not shown) actuates the cylinders 5 to perform the cut between the first and second blades.

The design of the present invention allows the rake angle to be set according to the specific requirements of the material to be cut, so for example, a high rake angle is only used for the very hardest, thickest slabs, whereas for thinner slabs or plates the rake angle is far less and in some cases may even be zero. The optimisation of angle may be based on real mill set up or actual slab conditions, rather than a pre-set assumption, so for example, when the temperature of thick or hard slab is high, then the rake angle can be reduced accordingly. Operating at lower rake angles, wherever possible, reduces side thrust.

Without the variation in rake angle provided by the invention, all material, whatever its thickness would be subject to the same amount of lift and impact as it dropped back onto the table, but the invention means there is only high lift only for the hardest, thickest plates and thinner plates are lifted far less distance and so suffer reduced impact from drop back onto the table compared to the impact the plate or slab would have suffered in a conventional up-cut raked shear. This reduces damage and marking of the slab.

Another advantage of setting the rake angle only as high as necessary for the specific material passing through the shear is that the cycle time for thin, or soft, slabs is reduced because of a reduced stroke requirement. Also the distortion of the thinner and softer slabs is minimised by setting the rake angle as low as possible.

Furthermore, the invention is easily adapted to suit different widths of shears and different maximum slab thicknesses. The use of a mechanical adjuster is safer and has no energy consumption when in stationary position, nor risk of leakage of hydraulic fluid onto the material, as there would be with hydraulic cylinders located above the material. The same mechanism allows for both long stroke adjustment for different slab thickness and for differential positioning to adjust the rake angle. The system is able to fit with a mill set up system and operate efficiently.

Figure 4A:
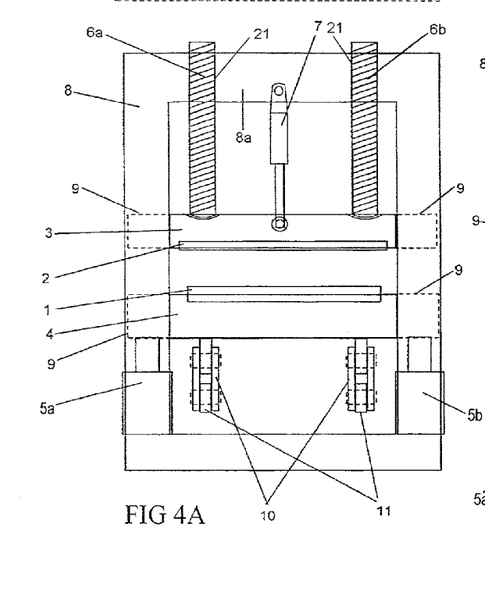
FIG. 4A illustrates an example of a variable rake shear according to the present invention before varying the rake.
Figure 4B:
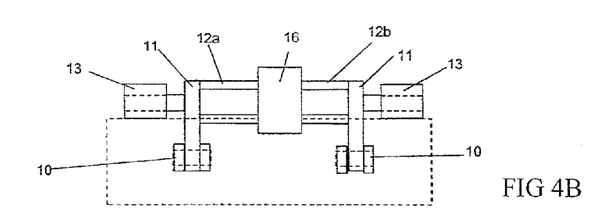
FIG. 4B shows the torque linkage elements of FIG. 4A in more detail.
Figure 4C:
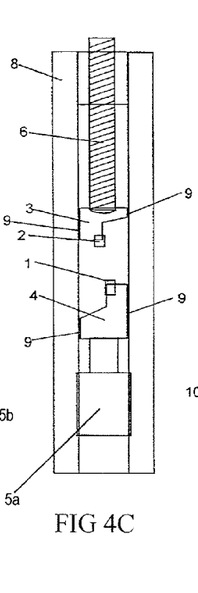
FIG. 4C shows one side of FIG. 4A from outside its housing.
Figure 4D:
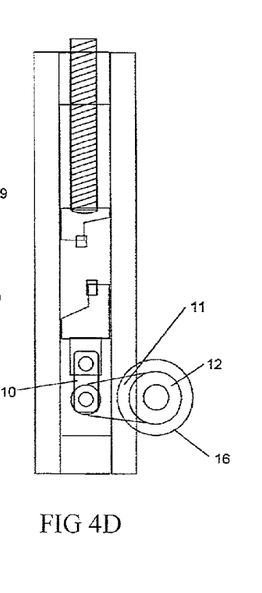
FIG. 4D shows one side of FIG. 4A from inside its housing.
Figure 5:
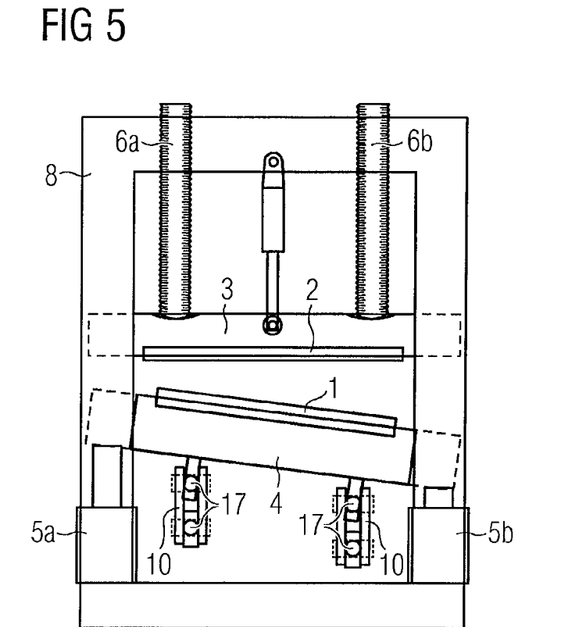
FIG. 5 shows the example of FIG. 4A with the bottom blade raked.
Figures 6A, 6B, 6C:
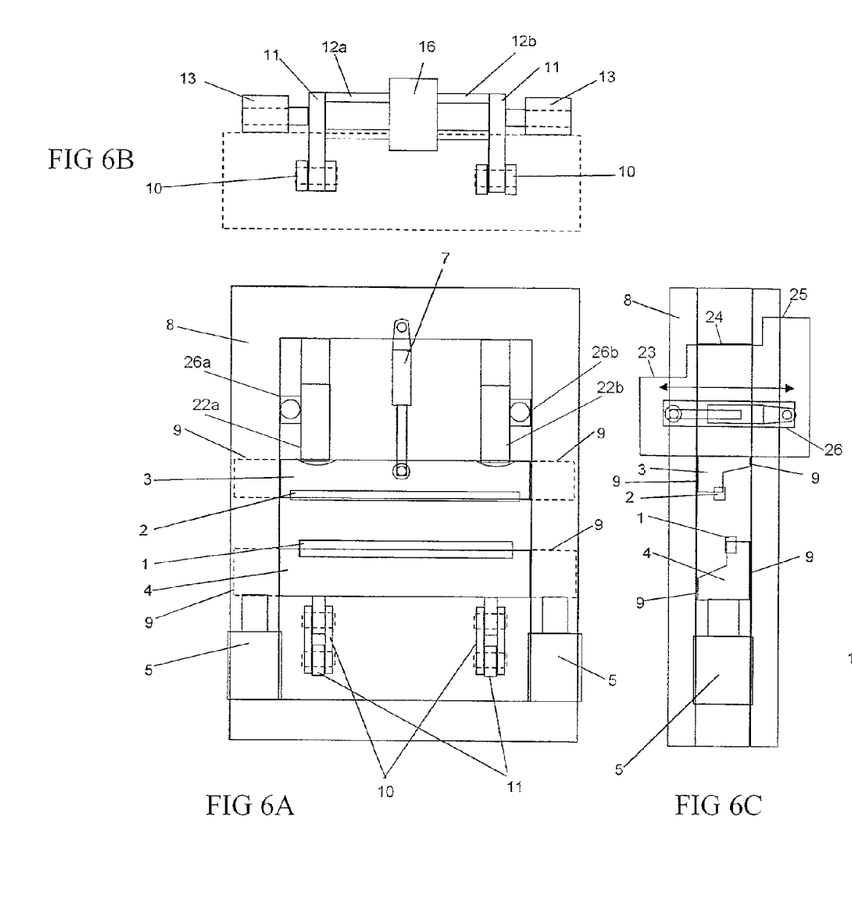
FIG. 6A-6D show a first alternative blade rake adjuster for the embodiments in FIG. 4.
Figure 6D:
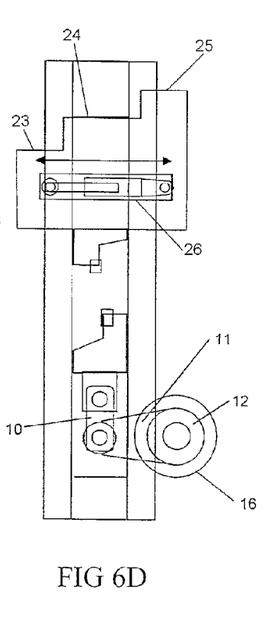
Figure 7A:
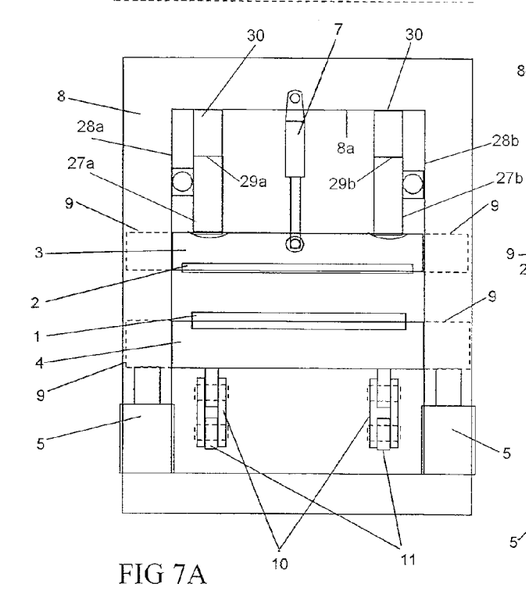
FIGS. 7A-7D show a second alternative blade rake adjuster for the embodiments in FIG. 4.
Figure 7B:
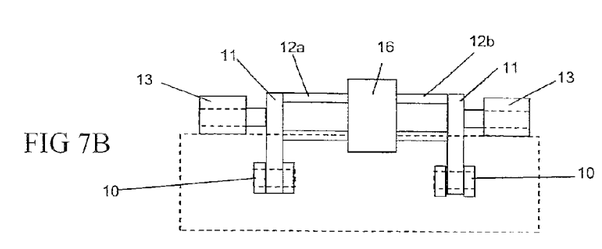
Figure 7C:
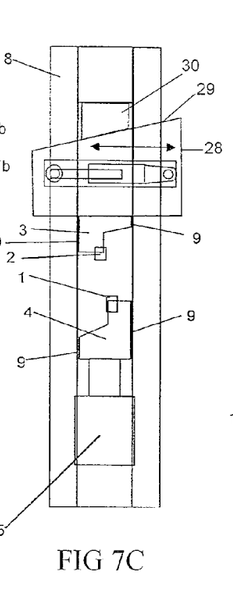
Figure 7D:
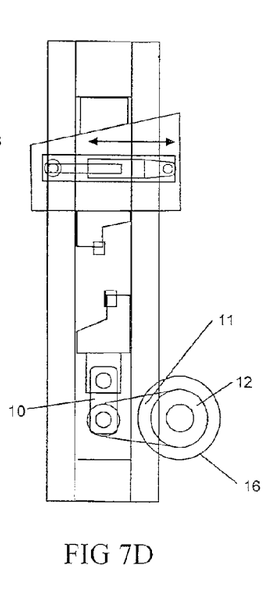
Figure 8A:
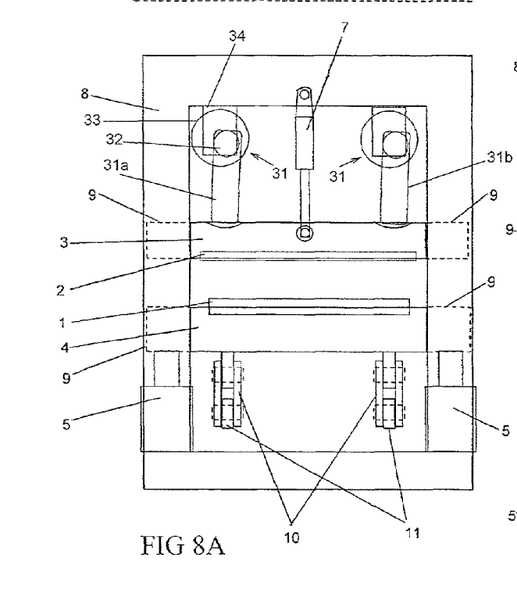
FIGS. 8A-8D show a third alternative blade rake adjuster for the embodiments in FIG. 4.
Figure 8B:
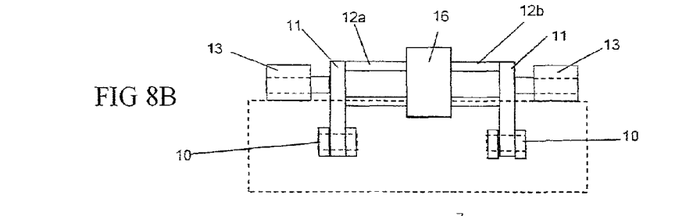
Figures 8C, 8D:
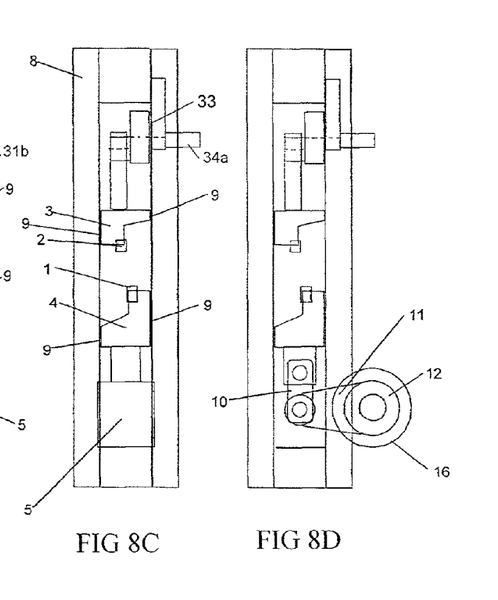
Figure 9A:
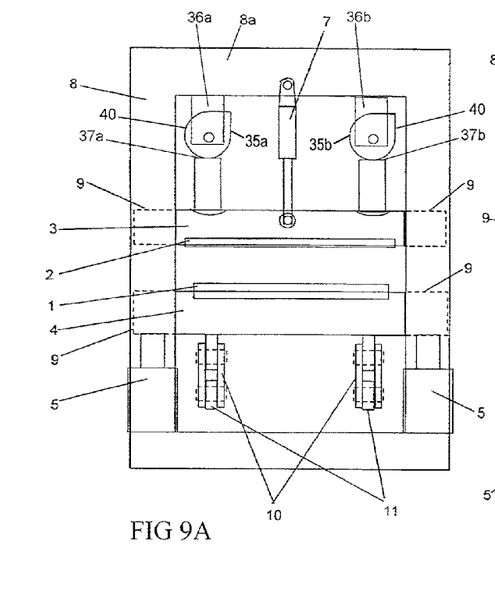
FIGS. 9A-9D show a fourth alternative blade rake adjuster for the embodiments in FIG. 4.
Figure 9B:
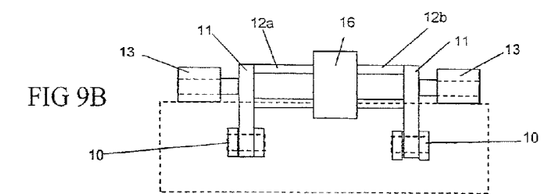
Figure 9C:
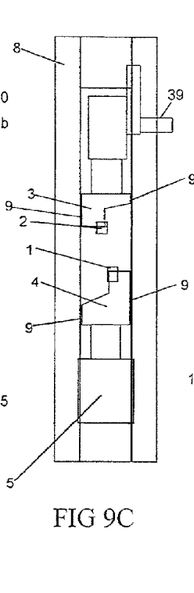
Figure 9D:
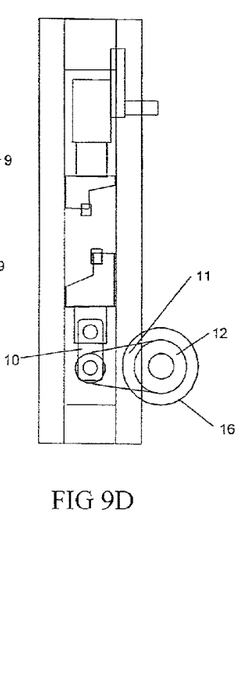

A solution for altering the rake of the bottom blade is illustrated in FIGS. 4A-4D and FIG. 5. FIG. 4A, like FIG. 2A illustrates the two blades 1, 2 in their initial positions. The first blade 1 mounted in one edge of the first beam 4 movable within the structure of a housing 8 on slideways via guides 9. Some surfaces of the beam 4 may make contact with each side wall of the guides 9 as shown in FIGS. 4C and 4D. The beam is supported on cutting cylinders 5a, 5b. In the preferred embodiment there are two cutting cylinders 5a, 5b so that the cutting forces can be easily and directly transferred into the two sides of the housing 8, but embodiments with a single cutting cylinder, or with more than two cylinders are also possible. The beam 4 is also connected to a torque linkage 10, 11, 12, 13, illustrated in more detail in FIG. 4B. In FIG. 4B it can be seen that in this embodiment, the torque tube is split into two parts 12a and 12b and these two parts are linked by a clutch 16. This is also visible in FIG. 4D. In order to change the rake of the bottom blade 1 as illustrated in FIG. 5, the clutch 16 is released and cylinders 5a and 5b are set to different strokes, so that the blade 1 takes up the required rake. The clutch 16 is then engaged to lock the two parts of the torque tube 12a and 12b together again. As shown in FIG. 5, the links 10 require spherical bushes 17 or a similar connection where they connect to the beam 4 and torque arms 11, in order to allow the beam to take up an angle relative to the torque tube. During the cutting action the torque tube mechanism maintains the rake angle constant and ensures that each of the cylinders 5a and 5b only needs to generate half of the maximum cutting force. The term clutch for the mechanism 16 includes mechanisms which engage and disengage teeth as well as friction type clutches and other mechanisms which allow parts of the torque tube 12a and 12b to be rotated relative to one another and then locked together.

The shear may have either the top blade adjustment mechanism illustrated in FIGS. 2A-2D and 3, or the bottom blade adjustment mechanism illustrated in FIGS. 4A-4D and 5, or it may incorporate both mechanisms. The advantage of incorporating both mechanisms is that it is possible to minimise the distortion of the prime material.

The shear is often used to do both a head crop and a tail crop on the material. As an example, if the top raked blade is on the head end side of the shear and the horizontal bottom blade is on the tail end side of the shear, then for the head crop the raked top blade contacts the scrap head end material whereas the prime material of the plate is in contact with the horizontal bottom blade and therefore there is minimum distortion of the prime material. However, for the tail crop it is the prime material which is in contact with the raked top blade and the scrap tail end which is in contact with the horizontal bottom blade. Consequently there is distortion of the prime material which is not desirable.

However if the shear incorporates both the top blade adjustment mechanism and the bottom blade adjustment mechanism, then a choice of which blade is raked can be made. For the head end crop the bottom blade which is in contact with the prime material of the plate is horizontal and the top blade which is in contact with the scrap head end is raked. But for the tail end crop the top blade which is in contact with the prime material of the plate is made horizontal whilst the bottom blade which is in contact with the scrap tail end is raked. In this way any distortion of the prime material is minimised.

In the case of a divide cut where the shear is used to divide a long plate into two or more shorter plates then both the head side and the tail side of the cut are prime material and so ideally there should be minimum distortion of both sides. In this case both the top and bottom blades can be raked each at half the rake angle that would be required if only one blade was raked and thus the distortion of both the head side and the tail side of the cut are minimised.

In addition to the mechanism for adjusting the rake of the top blade and the mechanism for adjusting the rake of the bottom blade the shear can also incorporate a toggle mechanism similar to that of the prior art shear illustrated in FIGS. 1A and 1B. For example the toggle mechanism may be installed between the top of the housings 8 and the screw adjusters 6a, 6b such that the screw adjusters alter the rake of the blade and provide fine control of the gap between the blades and the toggle mechanism allows the shear to open quickly to a very large gap—for example for cobble clearance—and to close quickly to the cutting position when a cut is required.

Whilst the descriptions above refer to an up-cut type shear in which the bottom blade moves up to perform the cutting operation, mechanisms similar to those described may also be used on a down-cut type shear in which the top blade moves down to perform the cutting operation.

Many shears incorporate hold down equipment, or clamps to hold the material in place during the shearing operation. If the hold down equipment is attached to the blade beams, as is often the case, then some minor modifications to the design may be required to accommodate the varying rake of the blade beam, but these are simple—for example mounting the hold down equipment directly on the housing or having a pivoting mechanism in the hold down equipment—and will not be described in detail. In the case of a shear where both the top and bottom blades can be adjusted for rake it may be advantageous to have two sets of hold down equipment one to clamp the material against the bottom blade and a separate set to clamp the material against the top blade. If the shear is going to be operated with both blades raked, then it may be advantageous to arrange the material clamping equipment to keep the plate horizontal instead of clamping against one or other of the blades.

The invention claimed is:

1. A variable rake shear comprising:
   a housing;
   a first blade mounting and a second blade mounting supported by the housing;
   a first blade mounted in the first blade mounting, and a second blade mounted in the second blade mounting;
   a torque tube linkage mechanism configured and operable for adjusting torque to control the balance of force on one of the first and second blade mountings;
   a control device configured and operable to control movement of one of the first and second blade mountings to cause the blades to shear a material; and
   a rake adjustment mechanism configured for adjusting the rake angle for at least one of the first and second blade mountings;
   wherein:
   each blade mounting is movable in at least one dimension relative to the housing;
   one of the first and second blades is an active blade and the other of the first and second blades is a passive blade; and
   the blade mounting for the active blade is attached to the torque tube linkage mechanism, which is configured and operable for adjusting torque to control the balance of force on the blade mounting for the active blade, as the blade mountings move the blades past each other, the torque tube linkage mechanism comprising a torque tube on torque tube bearings, and torque tube connectors connecting the torque tube to the blade mounting for the active blade, and wherein the rake adjustment mechanism comprises a clutch in the torque tube linkage mechanism and the clutch is configured and operable to open and permit balancing of the force on the blade mounting for the active blade.

2. The shear according to claim 1, further comprising one or more hydraulic cylinders, located at spaced apart locations beyond each end of the active blade so that the maximum cutting force applied to the active blade along a length of the active blade is substantially equal to the sum of the maximum cutting forces provided by each cylinder.

3. The shear according to claim 1, wherein the rake adjustment mechanism is for the passive blade and comprises at least one rake adjuster mounted between a respective blade mounting for the passive blade and the housing.

4. The shear according to claim 3, wherein the rake adjuster comprises a mechanical adjuster.

5. The shear according to claim 4, wherein the mechanical adjuster is selected from one or more of screws, removable supports in the housing, eccentrics, wedges, and cams.

6. The shear according to claim 3, wherein the at least one rake adjuster comprises two rake adjusters.

7. The shear according to claim 6, further comprising a toggle mechanism connected between the housing and the blade mounting for one of the blades, configured and operable to cause a large initial adjustment of the one blade mounting relative to the other blade mounting.

8. The shear according to claim 1, further comprising a balancing cylinder connected between the mounting of the passive blade and the housing from which the mounting of the passive blade is suspended at least during setting up of the shear.

9. The shear according to claim 1, further comprising one or more material clamps to clamp the material being sheared during shearing.

10. A variable rake shear comprising:
    a housing;
    a first blade mounting and a second blade mounting supported by the housing;
    a first blade mounted in the first blade mounting, and a second blade mounted in the second blade mounting;
    a torque tube linkage mechanism configured and operable for adjusting torque to control the balance of force on one of the first and second blade mountings;
    a control device configured and operable to control movement of one of the first and second blade mountings to cause the blades to shear a material; and
    a rake adjustment mechanism configured for adjusting the rake angle for at least one of the first and second blade mountings;
    wherein:
    each blade mounting is movable in at least one dimension relative to the housing;
    one of the first and second blades is an active blade; and
    the blade mounting for the active blade is attached to the torque tube linkage mechanism, which is configured and operable for adjusting torque to control the balance of force on the blade mounting for the active blade, as the blade mountings move the blades past each other, the torque tube linkage mechanism comprising a torque tube on torque tube bearings, and torque tube connectors connecting the torque tube to the blade mounting for the active blade.

* * * * *

UNITED STATES PATENT AND TRADEMARK OFFICE
CERTIFICATE OF CORRECTION

PATENT NO. : 9,908,188 B2
APPLICATION NO. : 14/408640
DATED : March 6, 2018
INVENTOR(S) : Philip Round Page 1 of 1

It is certified that error appears in the above-identified patent and that said Letters Patent is hereby corrected as shown below:

In the Claims

Claim 10, at Column 11, Line 3, insert --, and wherein the rake adjustment mechanism comprises a clutch in the torque tube linkage mechanism and the clutch is configured and operable to open and permit balancing of the force on the blade mounting for the active blade"-- after "active blade".

Signed and Sealed this
Twenty-sixth Day of November, 2019

Andrei Iancu
*Director of the United States Patent and Trademark Office*